United States Patent
Harmand et al.

(10) Patent No.: US 7,153,073 B2
(45) Date of Patent: Dec. 26, 2006

(54) SYSTEM AND METHOD FOR PRECISION MACHINING WITH A SINGLE POINT CUTTER

(75) Inventors: Brice Harmand, San Diego, CA (US); Pierre Harmand, Annecy (FR)

(73) Assignee: Harmand Family Limited Partnership, San Diego, CA (US)

( * ) Notice: Subject to any disclaimer, the term of this patent is extended or adjusted under 35 U.S.C. 154(b) by 0 days.

(21) Appl. No.: 11/299,275

(22) Filed: Dec. 9, 2005

(65) Prior Publication Data
US 2006/0153652 A1 Jul. 13, 2006

Related U.S. Application Data

(60) Provisional application No. 60/593,096, filed on Dec. 9, 2004.

(51) Int. Cl.
*B23C 3/00* (2006.01)
(52) U.S. Cl. .......................... 409/195; 82/118; 483/12
(58) Field of Classification Search ................ 409/147, 409/186, 188, 195; 483/12; 29/568; 82/118, 82/133
See application file for complete search history.

(56) References Cited

U.S. PATENT DOCUMENTS

| | | | | | |
|---|---|---|---|---|---|
| 3,417,661 | A | * | 12/1968 | Dancsik | 409/86 |
| 4,784,541 | A | * | 11/1988 | Umehara et al. | 409/186 |
| 5,906,460 | A | * | 5/1999 | Link et al. | 409/186 |
| 6,122,999 | A | * | 9/2000 | Durazo et al. | 82/1.11 |
| 6,568,884 | B1 | * | 5/2003 | Mies | 409/1 |
| 6,615,697 | B1 | * | 9/2003 | Nakagawa | 82/118 |
| 6,884,204 | B1 | * | 4/2005 | Watanabe | 483/12 |

* cited by examiner

*Primary Examiner*—Willmon Fridie, Jr.
(74) *Attorney, Agent, or Firm*—Eleanor M. Musick; Procopio Cory Hargreaves & Savitch LLP

(57) ABSTRACT

The single point machining head includes a probe that is removably mounted on a carriage that moves radially relative to a central axis of the machining head. A system controller moves the carriage in a radial direction while the machining head is fed in a vertical direction so that the probe contacts the surface of a workpiece. Each point of contact on the workpiece becomes a datapoint including the radial position and the vertical position when contact occurred. The surface of the workpiece is scanned with the probe and a profile is generated using the points of contact. A system controller calculates a difference between the measured profile and a desired profile to be machined to determine the amount of material to remove.

15 Claims, 9 Drawing Sheets

SYSTEM AND METHOD FOR PRECISION MACHINING WITH A SINGLE POINT CUTTER

RELATED APPLICATIONS

This application claims the priority of U.S. provisional application No. 60/593,096, filed Dec. 9, 2004, which is incorporated herein by reference.

FIELD OF THE INVENTION

The invention generally relates to a method and system for cutting a profile in a workpiece using a single point cutting head and the ability to automatically determine a cutting profile in the workpiece.

BACKGROUND OF THE INVENTION

Machining of materials to create openings or recesses of different shapes is used in the manufacture and repair of a wide range of objects. In applications where the dimensional tolerances, roundness and smoothness of the machined surface are important, special tools are often required, especially when the material to be machined is very hard or otherwise difficult to machine. For example, transfer machines within an automated manufacturing line often require multiple machining heads with a variety of different cutting bits to form rounded openings of the desired profiles. The more different machining heads required in a line transfer machine, the more complex the machine becomes, and the more floor space it requires. As an alternative to multiple machining heads, a single cutting machine can be adapted to receive a variety of different cutting bits. However, when the cutting bit needs to be changed, the processing line must be paused or shut down, resulting in reduced throughput.

In an exemplary application, such cutting tools are used in the repair of the cylinders heads of internal combustion engines to re-establish the high quality seal required for efficient engine performance and fuel consumption. It is well known among vehicle mechanics that valve seats can be machined to remove the outer surface of the seat to expose a smooth and uniform contact surface by a technique commonly referred to as "lapping". This lapping technique is accomplished by removing the cylinder head from the engine and machining the valve seats with a cutting blade. In most common commercial systems, a valve seat has a profile with three different angles: a throat angle, a valve seat angle, and a top angle. In order to simultaneously cut the different angles, a "three-angle" cutting blade or bit is used. Each cutting edge of the three-angle cutting bit corresponds to one of the valve seat angles to be machined. Three-angle cutting bits vary in size and shape depending on the type of cylinder head valve seat being machined. These three-angle cutting bits are currently used by valve seat and guide manufacturers.

A disadvantage of the lapping technique is the risk of damage to the surface finish from vibration, chattering, or undulation generated by flexion of the cutting bits. This problem develops because certain cylinder head valve seat shapes require a three-angle cutting bit with a long cutting edge. Rotation of this long cutting edge when the edge is in contact with the work surface can create flexions in the cutting bit, especially when the material is difficult to machine, e.g., a very hard material. These flexions generate vibrations, chattering, or undulations which can disrupt contact between the cutting edge and the surface being cut. The skipping blade can damage the surface finish of the valve seat resulting in a machined valve seat that is not acceptable by Original Equipment Manufacturer (OEM) standards.

Another disadvantage of the lapping technique is a decentering phenomenon. As stated above, cutting efforts with a long cutting edge/surface create flexions. These flexions create an unbalanced radial cutting effort which decenters the three-angle cutting blade, also resulting in unacceptable quality.

Still another disadvantage of the lapping technique is the large number of three-angle cutting blades needed to machine different types of valve seats. Each type of engine has a different valve seat profile. Thus, one or more unique three-angle cutting blades may be needed for each type of engine.

Single point cutting heads for use in machining systems are described in U.S. Pat. No. 6,086,293, U.S. Pat. No. 6,382,883, U.S. Pat. No. 6,382,884, U.S. Pat. No. 6,530,727 and U.S. Pat. No. 6,640,410, the disclosures of which are incorporated herein by reference in their entireties. Briefly, these systems utilize a single cutting tip that is mounted on a carriage that moves radially outward and inward as the spindle rotates to cut varying profiles. Such systems incorporate computer controllers in which software is provided to permit the machine operator to design a desired profile, for example, a valve seat in an engine cylinder head. Exemplary software for creating a profile to be machined is described in U.S. Publication No. 2004/0186793, the disclosure of which is incorporated herein by reference. The process of designing the profile must take into consideration any pre-existing topography in the workpiece. Where the surface of the workpiece has pre-existing topography, the operator must provide a rendering of the existing cylinder head profile prior to machining. The desired and pre-existing profiles are then overlaid in the software to determine the difference between the two profiles. The software then generates commands causing the machine to "zig zag" into the material machining only the metal/material that corresponds to the difference between the material's pre-existing profile (, i.e., the "casting") and the "cut profile" (desired profile). The requirement for such information results in a process that can become fairly difficult, especially when there is a large number of different radii and fairly complex shapes to reproduce. According to the present invention, a device and software combination provides means for measurement of the casting and cut profile area, providing a signal for input into the computer controller for automatically generating the control commands for generating the desired profile in the workpiece.

SUMMARY OF THE INVENTION

According to the present invention, the ease of use of single point cutting machines is enhanced by eliminating the constraint of having to generate a material profile to identify the material to be removed. The system has the capacity to automatically duplicate the material profile with a precision of the order of 0.01 mm.

In the exemplary embodiment, a "finger" or measurement sensor is attached to the base of the machining head, such as that disclosed in U.S. Pat. No. 6,530,727 and U.S. Pat. No. 6,640,410, at the location where a tool holder would normally be installed during machining. The distal end of the sensor makes physical contact with the material of the workpiece, e.g., a cylinder head, while the carriage that translates the tool holder and, in this case, the sensors, travels. One or more piezoelectric discs or chips are sandwiched between two planar surfaces disposed along the axis near the proximal end of the sensor. The piezoelectric sensor translates impacts of the distal end of the sensor on the work surface into electric signals indicative of "hills" and "valleys" within the surface topography. A shock absorber may be provided to allow the sensor to flex to prevent the device from being damaged should the sensor be inadvertently forced against the workpiece with excessive force.

The electric signal generated by the piezo sensor is transmitted to a calculator/computer via a radio frequency (RF) or infra red (IR) signal or any other practical electrical or optical means. A receiver detects the transmitted signal and communicates the information to the computer. The computer generates a profile based on the pre-existing topography of the workpiece surface. Software stored within the computer or an associated memory is then directed to determine a difference between the pre-existing topography and the desired profile to be cut.

When the sensor touches the workpiece, the coordinates of the carriage and spindle sheath are memorized, the carriage is backed up, the spindle sheath is fed upward and the steps are repeated, causing a series of points to be gathered corresponding to areas where the sensor has contacted the workpiece. Each point is defined by two values: the position of the carriage and the position of the spindle sheath at the time of contact. The set of points represents the shape of the pre-existing topography of the workpiece in the swept area.

The electric signal coming from the piezo is sent via RF or IR transmission to the receiver that receives the calibrated impulse and transmits it to the microprocessor of the machine. In the exemplary embodiment, an RF signal is used. The radio transmitter and receiver are hybrid AM or FM modules with a built-in antenna and are readily available in the industry. Because the transmitter spins with the machine head, it is preferably battery powered.

Another aspect of the invention comprises alternate configurations for implementing the kinematics for movement of the tool holder carriage as is described in U.S. Pat. No. 6,640,410. In the standard configuration of the single point cutter as described in the '410 patent, the kinematics of the head/spindle and the cantilever/counterweight components are linked and driven by a shaft, an arbor, which is itself driven by a rotating pre loaded thrust ball bearing system that is, in turn, driven by a satellite roller screw and a servo motor. According to the present embodiment of the invention, the servo motor and satellite roller screw system, plus rotating housing and pre-loaded bearing/stop are replaced with a linear motor built/installed directly inside the spindle and driving the dual/twin mechanism of the machining head directly.

In still another aspect of the invention, the tool holder carriage is driven by a small linear motor located within the machining head. The carriage drives the balancing mechanism (counterweight) itself, in an autonomous manner. This solution greatly simplifies the kinematics devised in the single point cutter described in the '727 and '410 patents and also significantly reduces the number of moving parts in the machining head.

In both embodiments of the machining head kinematics, the linear motors are fed with a rotating distributor. The motor rotates with the machining head/spindle.

BRIEF DESCRIPTION OF THE DRAWINGS

The present invention will be more clearly understood from the following detailed description of the preferred embodiments of the invention and from the attached drawings, in which:

FIG. 2a shows the sensor attached to a mounting bracket, FIG. 2b shows the sensor attached to a mounting bracket with portions of the outer housings cut away; and FIG. 2c shows the unmounted sensor and spring tensioner;

DETAILED DESCRIPTION OF THE PREFERRED EMBODIMENTS

In a first embodiment of the present invention, the utility and ease of use of single point cutting machines are enhanced by eliminating the constraint of having to draw a material profile. The system has the capacity to automatically duplicate the material profile with a precision of the order of 0.01 mm. The present invention uses a sensor 200 to determine the profile that is to be duplicated.

Figure 1:
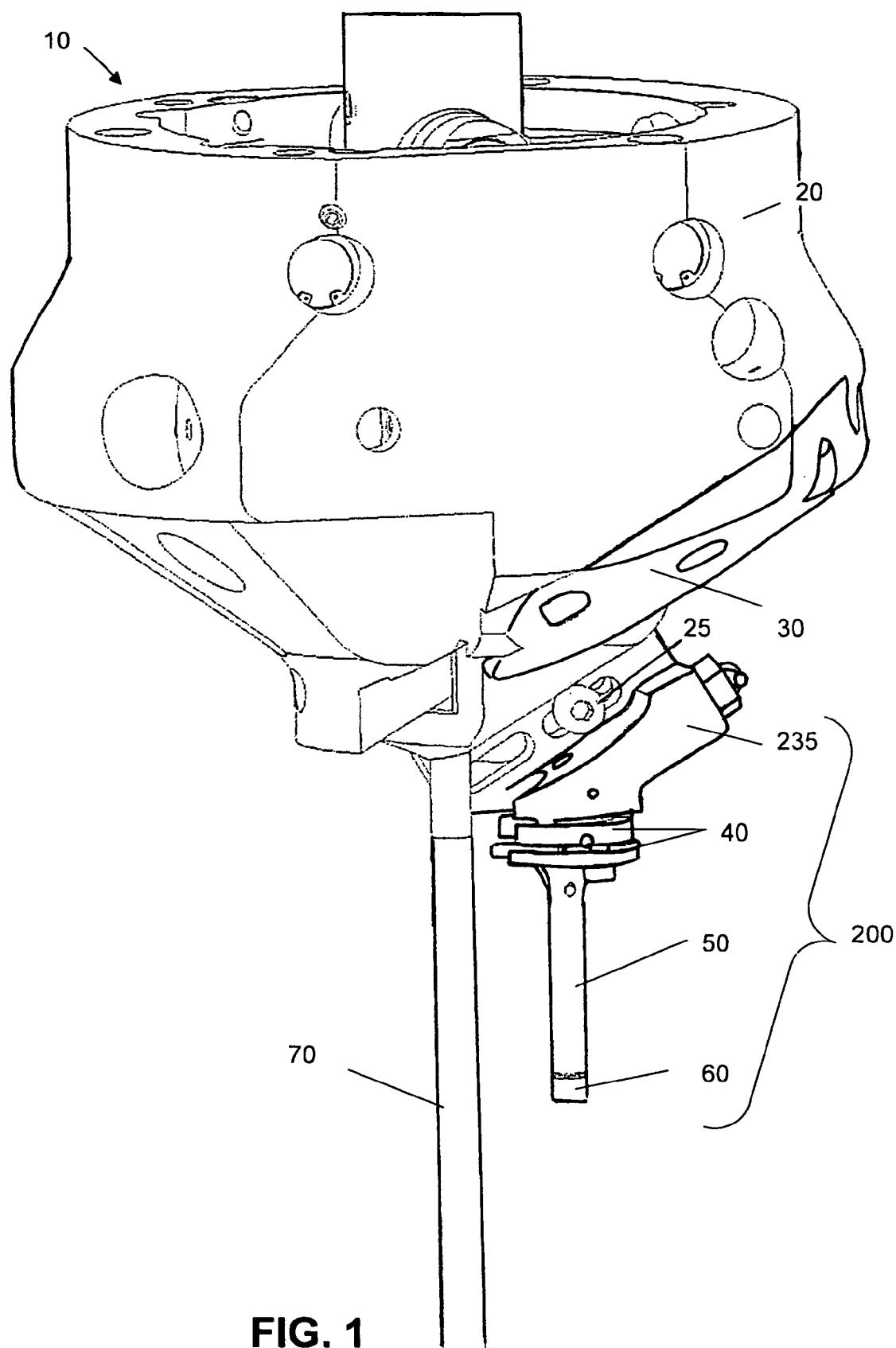
FIG. 1 is a perspective view of a machining head with a first embodiment of the sensor attachment of the present invention.

Illustrated in FIG. 1, in the exemplary embodiment, a sensor 200 is attached to the carriage 30 at the lower extent of the machining head 10, such as disclosed in U.S. Pat. No. 6,530,727. The sensor 200 is installed in a similar manner and in place of the cutting tool holder which would be installed during machining. The carriage feed driving assembly provides control of the inward and outward movement of the carriage head. The sensor is first mounted on the carriage head through one of a plurality of mounting holes to determine the profile that is to be cut into the material and feed the information to the computer. Once the profile has been determined and stored into the computer, the sensor is removed.

Figure 2:
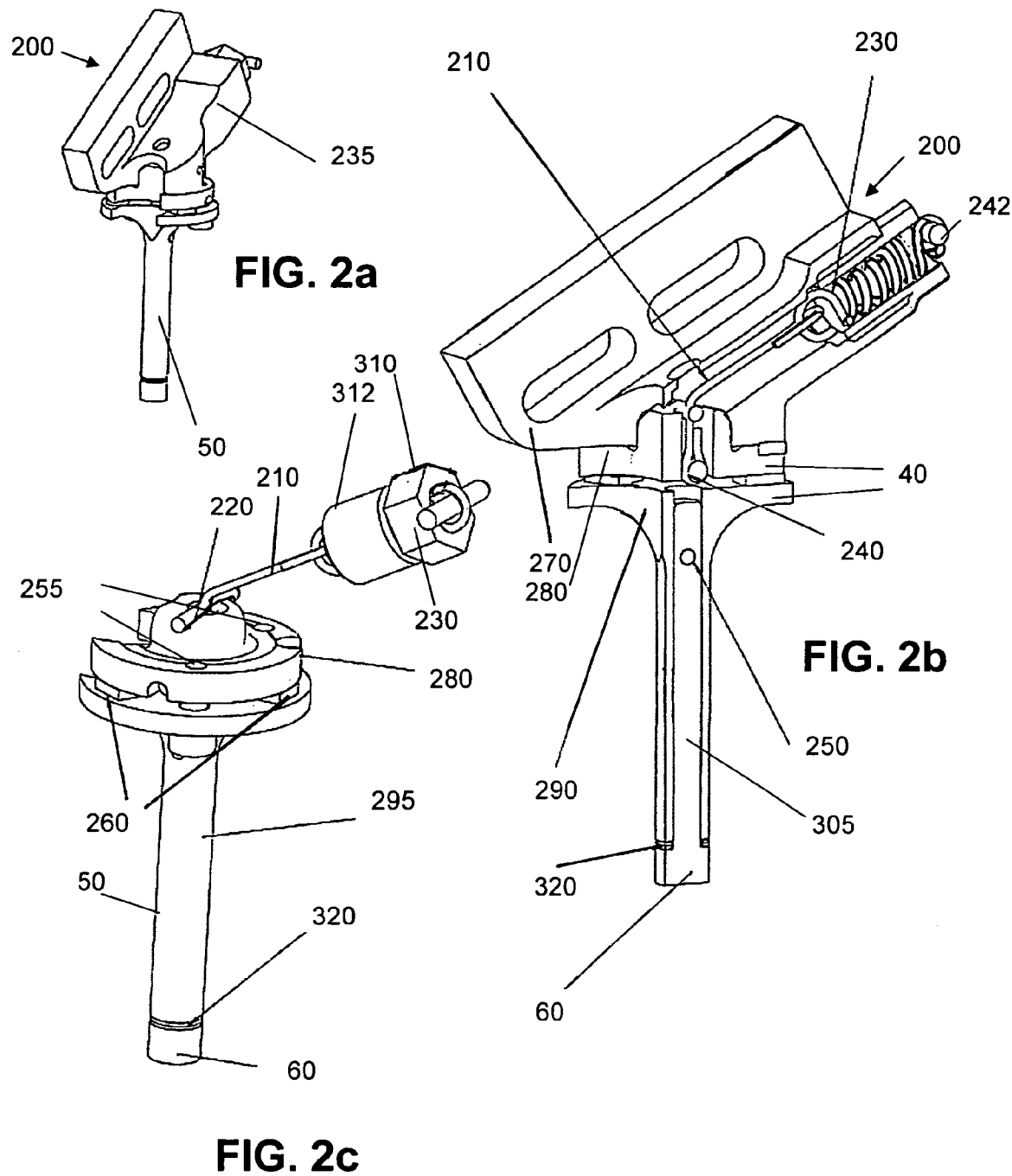
FIGS. 2a–2c are different perspective views showing details of the first embodiment of the inventive sensor, where

Referring to FIGS. 2*a–c*, the sensor assembly 200 has two main components: the mounting assembly and the sensor assembly. The mounting assembly includes a sensor mounting bracket 270, a cable 210, a spring tensioner 230, a spring housing 312, a spring holder 310, cylindrical pins 240 and 242, and a mounting assembly cover 235. The sensor assembly includes a sensor insert 305, a sensor sleeve 50, upper and lower piezo plates 280 and 290, and one or more piezoelectric chips 260. The sensor insert 305 is retained co-axially within the sensor sleeve 50 by cylindrical pin 250, which passes through corresponding bores formed in the sleeve 50 and insert 305. The distal end 60 of insert 305 extends beyond the lowest extent of sleeve 50 and has an outer diameter substantially equal to the outer diameter of sleeve 50. Distal end 60 is the contact surface for the sensor. Sensor insert 305 is preferably formed from a resilient metal, such as titanium, or similar material. The two part construction allows the contact surface (distal end 60) to be replaced when it becomes worn without requiring replacement of the entire sensor assembly. Washer 320 is disposed between the lower end of the sensor tube 50 and the shoulder of distal end 60. Washer 320 may be metal, nylon or rubber, or may be formed of an elastomer or other resilient material.

The proximal end of the sensor 200 includes two planar surfaces 40 comprising an upper piezo plate 280 and a lower piezo plate 290. The sensor sleeve 50 is part of, and may be formed integrally with, the lower piezo plate 290. The upper piezo plate 280 and the lower piezo plate 290 are connected together by connecting pins 255 in a manner that allows the lower piezo plate 290 to slightly move within the z axis relative to the upper piezo plate 280. There may be one, two, three or more piezoelectric discs or chips 260 distributed generally uniformly radially around the upper surface of the lower piezo plate 290 near its perimeter, sandwiched between the two planar surfaces.

A spring mechanism is included in the mounting assembly to allow the sensor 200 to flex in order to prevent the device from being damaged should an error be made while manipulating the machining head which could result in the sensor 200 being forced too hard against a surface of the workpiece. In this protective mechanism, the upper piezo plate 280 is attached to the sensor mounting bracket 270 via cable 210, which in the preferred embodiment is formed from Kevlar®. A lower loop of cable 210 attaches to the upper piezo plate 280 via cylindrical pin 240 and at its upper end to the lower end of expansion spring 230. The upper end of spring 230 passes through an opening in spring holder 310 and is retained in place by cylindrical pin 242.

The piezoelectric chips 260 translate impacts of the distal end 60 of the sensor 200 on the work surface into electric signals indicative of "hills" and "valleys" within the surface topography. The electric signal generated by the piezoelectric chips 260 is transmitted to a calculator/computer via a radio frequency (RF) (AM or FM) or infrared (IR) signal or other appropriate electronic or optical signal. Preferably, the signal is provided to the system processor, which includes software for calculating how much material to remove and control the machining process. A receiver detects the transmitted signal and communicates the information to the computer. The computer generates a profile corresponding to the casting or pre-existing topography of the workpiece surface. If a machining profile is to be duplicated from, for example, another workpiece or another location on the same workpiece, the sensor 200 is used to measure the topography of the desired profile to be cut. Software stored within the computer or an associated memory is then directed to determine a difference between the pre-existing topography and the desired profile to be cut. A signal can then be generated for controlling cutting by a cutting bit mounted on the tool holder of the machining head.

Figure 7:
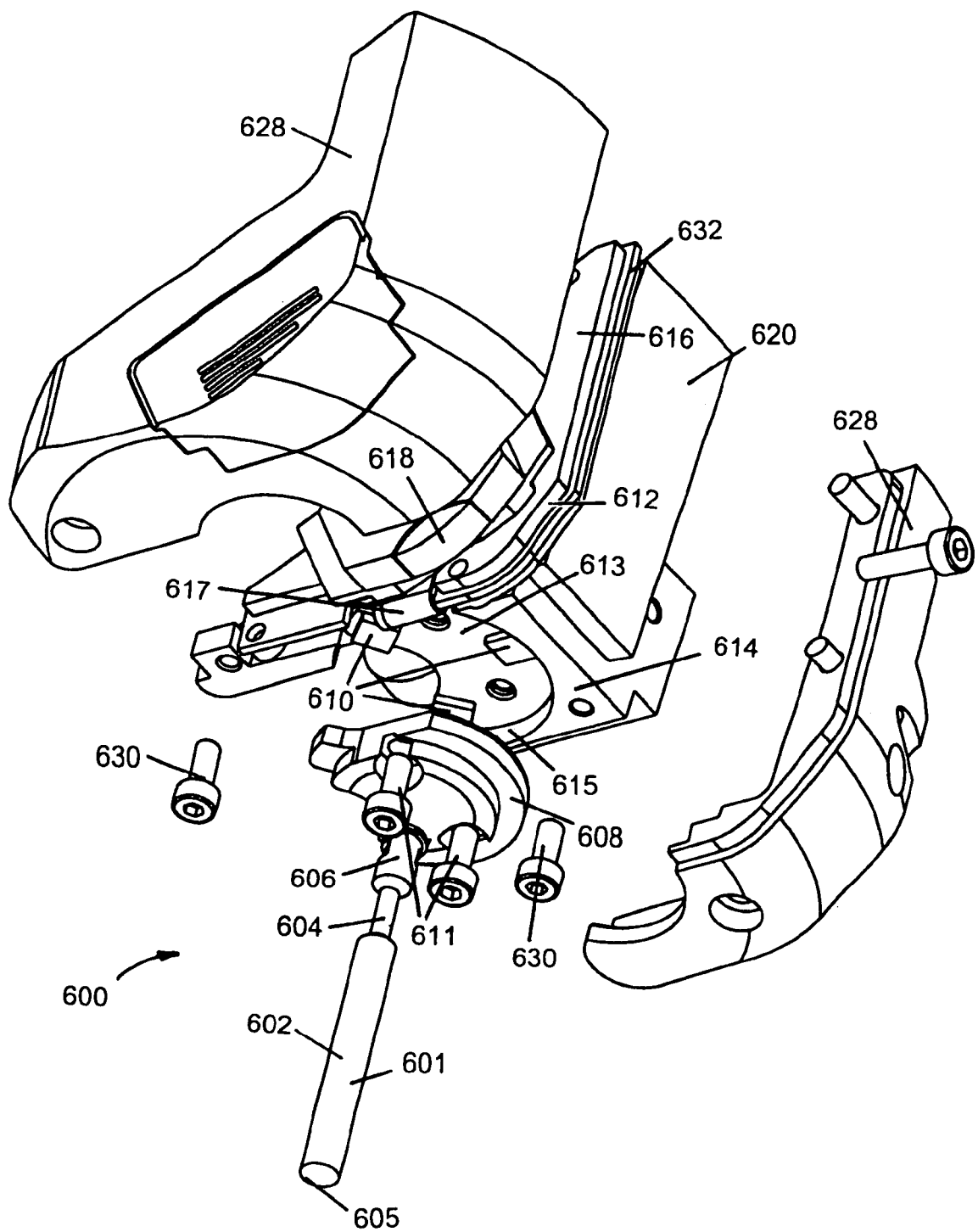
FIG. 7 is an exploded perspective view of a second embodiment of the sensor attachment.
Figure 8:
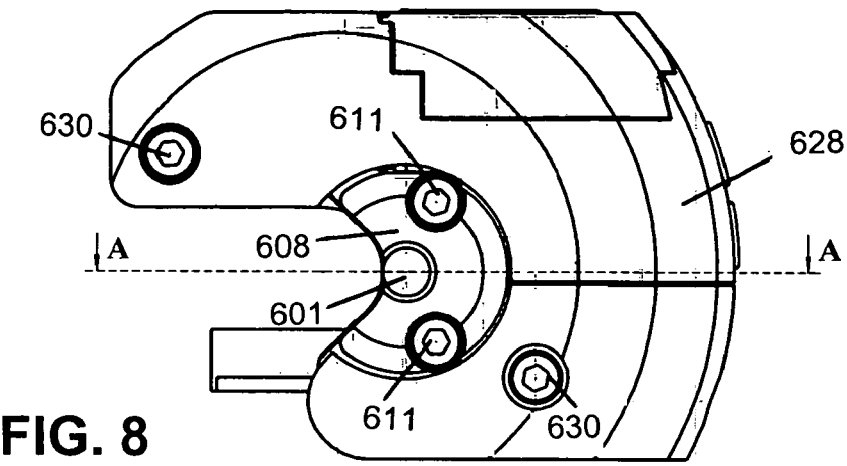
FIG. 8 is a bottom view of the sensor attachment of FIG. 7.
Figure 9:
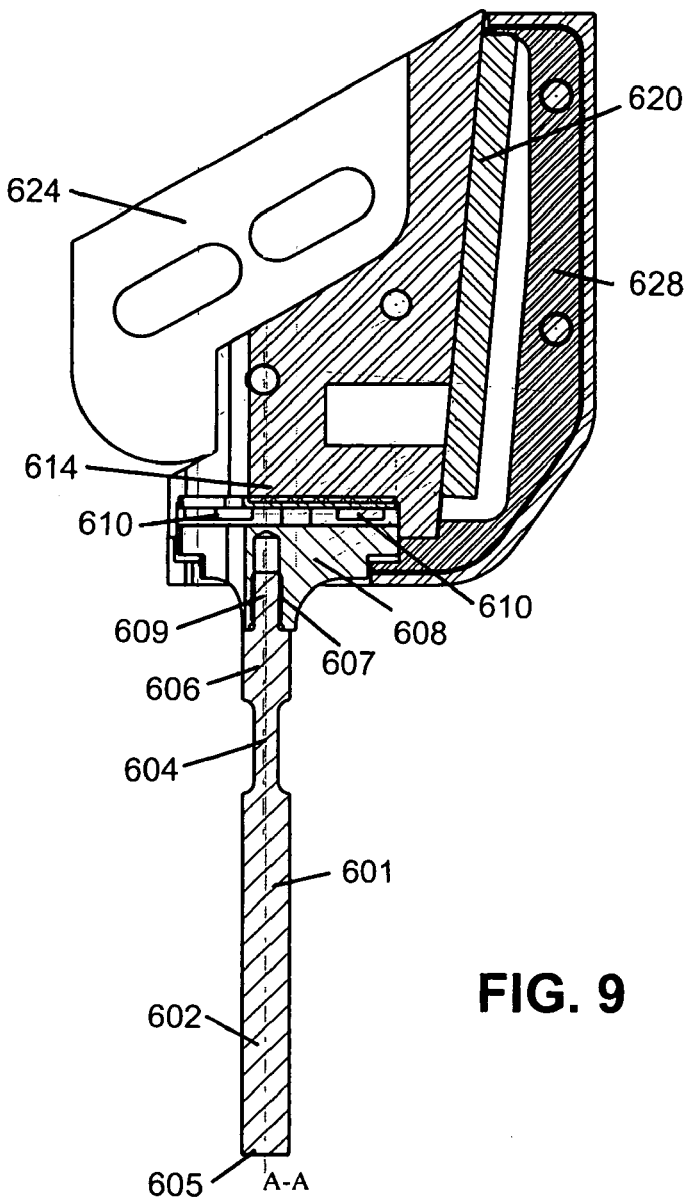
FIG. 9 is a cross-sectional view taken along line A—A of FIG. 8.

A second embodiment of the sensor is illustrated in FIGS. 7–9. Sensor assembly 600 comprises a probe finger 601, lower piezo plate 608, upper support 614 and piezoelectric chips 610. Three chips 610 are shown, however, there may be as few as one chip or more than three chips. The chips 610 are uniformly radially spaced within circular recess 615 in support 614. Support 614 also supports RF antenna 620.

Probe finder 601 has three main sections: distal section 602, center section 604 and proximal section 606. Distal section 602 and proximal section 606 has substantially equal diameters, while center section 604 has a reduced diameter to allow the probe finger to flex to prevent damage if the contact surface 605 of distal section 602 inadvertently impacts against the work surface with excessive force.

The proximal end 609 of probe finger 601 inserts into a corresponding bore 607 in lower piezo plate 608. Preferably, bore 607 and proximal end 609 are threaded so that probe finger 601 can be easily replaced by unscrewing the probe finger and screwing in a new finger when the existing probe finger becomes worn or damaged.

Lower piezo plate 608 is retainer in light contact with piezoelectric chips 610 by screws 611, which mate with threaded bores in upper support 614.

Upper support 614 also supports RF antenna 620 and printed circuit board (PCB) 612. The details of PCB 612 are shown in FIG. 10.

Figure 10:
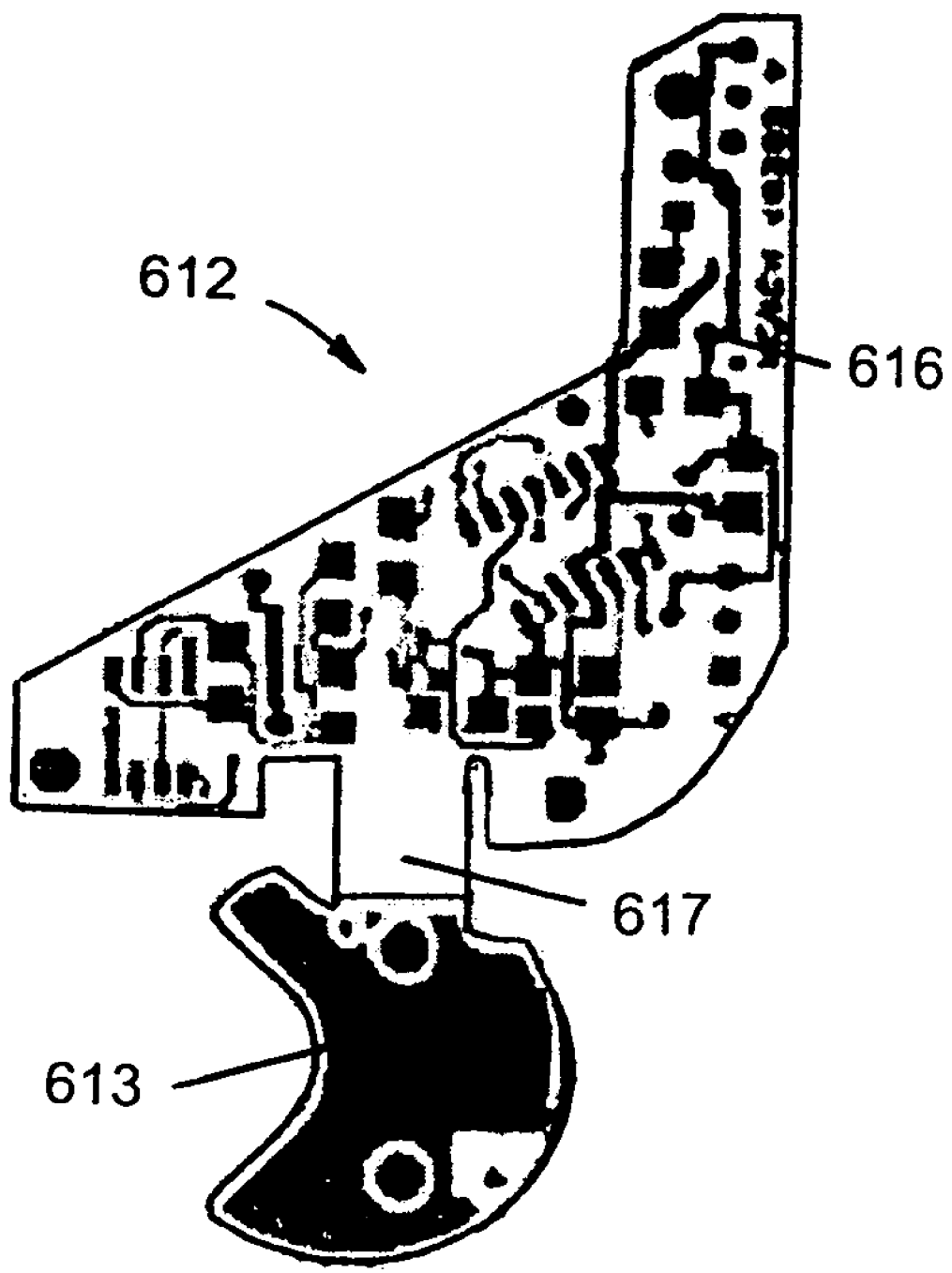
FIG. 10 is a diagrammatic view of the electronic components of the second embodiment of the sensor.

Referring to FIG. 10, PCB 612 includes a plurality of electronic components, including a microcontroller, and interconnect, for converting the electrical signals generated by the piezoelectric chips 610 into ASCII characters comprising messages containing information about the probe operation. Exemplary messages may include that the probe has contacted the material, the battery voltage is low, the device is operating, or the device will automatically shut off after a specified delay. The electronic components are formed on or attached to section 616 of PCB 612 using known technology. Section 613 of PCB 612 is sandwiched between the upper surfaces of piezoelectric chips 610 and the surface of recessed area 615 in support 614. Conductive surfaces on section 613 convey the voltage generated by the application of pressure to one or more piezo chips 610 to conductive lines across flexible section 617 to the circuitry on section 616. Voltage for operating the circuitry is provided by battery 618, which is disposed adjacent to and in electrical contact with PCB 612. Section 616 is attached to support plate 632 and electrically connected by appropriate conductors to RF antenna 620, which extends perpendicular to support plate 632. As in the first embodiment, RF antenna 620 is preferably a commercially-available hybrid AM or FM module. RF antenna 620 communicates with the system controller of the machining head to provide the measurements for calculation of the profile of the workpiece.

Apart from the probe finger 601, all components of the sensor assembly 600 are enclosed within housing 628, which is preferably a molded plastic. Housing 628 is attached to support 614 by inserting screws 630 into matching threaded bores in support 614. Bracket 624 provides for releasable attachment of the sensor assembly 600 to the carriage of the machining head (not shown)

After attachment of the sensor 200 to the tool holder on carriage 30 of the machining head 10 by way of a screw 25, nut and bolt, or other appropriate fastener, the measurement process may be performed manually or, preferably, automatically. Referring again to FIG. 1, the process of manually measuring a profile using sensor 200 is as follows: the carriage 30 of the machining head 10 with the sensor 200 mounted in place of the tool holder is brought to its minimum position (fully retracted to its minimum position), the spindle sheath is lowered so that it is positioned at the lowest point of the area to be "scanned" or "plotted". The operator feeds the carriage 30 one increment using an electronic wheel (0.01 to 0.02 mm), causing the machining head 10 to revolve one full revolution. If the distal end 60 of the sensor 200 has not yet contacted the cylinder head at this point, feeding of the carriage 30 continues after each revolution is completed. Once the sensor 200 touches the workpiece, the coordinates of the carriage 30 and spindle sheath are memorized, the carriage 30 is backed up two increments, the spindle sheath is fed upward one increment and the steps are repeated as before. The process continues as described until the carriage 30 and the spindle sheath reach the maximum value set by the machine user.

Whether automatic or manual measurement is performed, a series of points is gathered corresponding to areas where the sensor 200 has contacted the workpiece. Each point is defined by two values: the position of the carriage 30 and the position of the spindle sheath at the time of contact of the sensor 200. A simple transformation converts these points into Cartesian coordinates in an orthonormal line/reference point. The set of points represents the shape of the pre-existing topography of the workpiece in the swept area and can then be used by the machine as a reference for the material profile needed to machine the desired profile, for example, a valve seat area.

Because the sensor 200 does one full rotation each time it feeds upward, it automatically and incrementally measures the diameter, if any, that corresponds to a horizontal cross-section or slice of the target surface. This is particularly important if the pre-existing surface is a valve seat or similar cut into the surface that is being machined. Thus, the diameter at each incremental height of the pre-existing valve seat is measured. This measurement is then compared to the desired profile, which can either be entered separately by the operator as a series of dimensions or input into the computer by "scanning" another profile that is to be reproduced at the pre-existing profile.

A similar procedure could be performed using an optical sensor, however, it would be necessary to capture all the points on each diameter and then find the minimum values. This would be more complex and would require a larger number of values to be transmitted and stored.

At each rotation of the sensor 200, the sensor 200 either sends or does not send a contact signal, depending on whether contact is made. Thus, the information to be transmitted can very simple. In addition, this information need not be synchronized with the rotation of the spindle.

For automatic measurement of the profile, the operator first positions the sensor at the desired starting place and then the program within the system controller controls the rotation of the head at an approximate speed of 100 RPM. Each time the machining head does one rotation, if contact has been made anywhere, the position of the spindle sheath and of the carriage 30 are noted. If the sensor 200 did not make contact, the carriage 30 feeds a fixed value (0.1 mm, for instance) and repeats. Once the carriage 30 and the spindle sheath have reached the end of the travel, the spindle rotation stops. With all the spindle sheath and carriage 30 positions recorded during the cycle, the material's profile can be reconstituted by the software (connecting the dots).

The electric signal generated by the piezo sensor is first calibrated in time with a "monostable multivibrator" and, then is sent via RF or IR transmission, or other electronic or optical signal such as microwave or fiber optics, to the receiver that receives the calibrated impulse and transmits it to the microprocessor of the machine.

In the exemplary embodiment, an RF signal is used. The radio transmitter and receiver are hybrid AM or FM modules with a built-in antenna and are readily available in the industry. Because the transmitter spins with the machine head, it is preferably battery powered. Alternatively, the transmitter can operate passively, instead having its antenna adapted to convert a received signal into power and voltage for operating the sensor. Such passive RF devices are known in the art. (See, e.g., U.S. Pat. No. 6,147,655 of Roesner, et al., which is incorporated herein by reference.)

Another aspect of the invention comprises alternate configurations for implementing the kinematics for movement of the tool holder carriage 30 as is described in U.S. Pat. Nos. 6,640,410 and 6,530,727. Such machining heads are commercially available in the Contour EPOC system sold by Newen, Inc. of San Diego, Calif. In the '410 patent, a cantilever and counterweight system is disclosed for controlling tool holder movement while maintaining the dynamic balance needed for spinning of the machining head at high RPMs. In the standard configuration of the single point cutter as described in the '410 patent, the kinematics of the head/spindle and the cantilever/counterweight components are linked and driven by a shaft, an arbor, which is itself driven by a rotating pre loaded (play free) thrust ball bearing system, that is, in turn, driven by a satellite roller screw and a servo motor. According to the present embodiment of the invention, the servo motor and satellite roller screw system, plus rotating housing and pre-loaded bearing/stop, can be replaced with a linear motor, such as the ServoTube™ linear actuator available from Copley Controls Corp. of Canton, Mass. or a similar linear motor, that would have sufficient power, built/installed directly inside the spindle and driving the dual/twin mechanism of the machining head directly. The ServoTube™ motor, or a similar product, offers the reliability of a linear motor while simplifying the kinematics of the machining head/spindle.

In still another aspect of the invention, the tool holder carriage 30 is driven by a small linear motor located within the machining head. The carriage 30 drives the balancing mechanism (counterweight) itself, in an autonomous manner. This solution greatly simplifies the kinematics devised in the single point cutter described in the '410 patent and also significant reduces the number of moving parts in the machining head.

In both embodiments of the machining head kinematics, the linear motors are fed with a rotating distributor. The motor rotates with the machining head/spindle.

Figure 3:
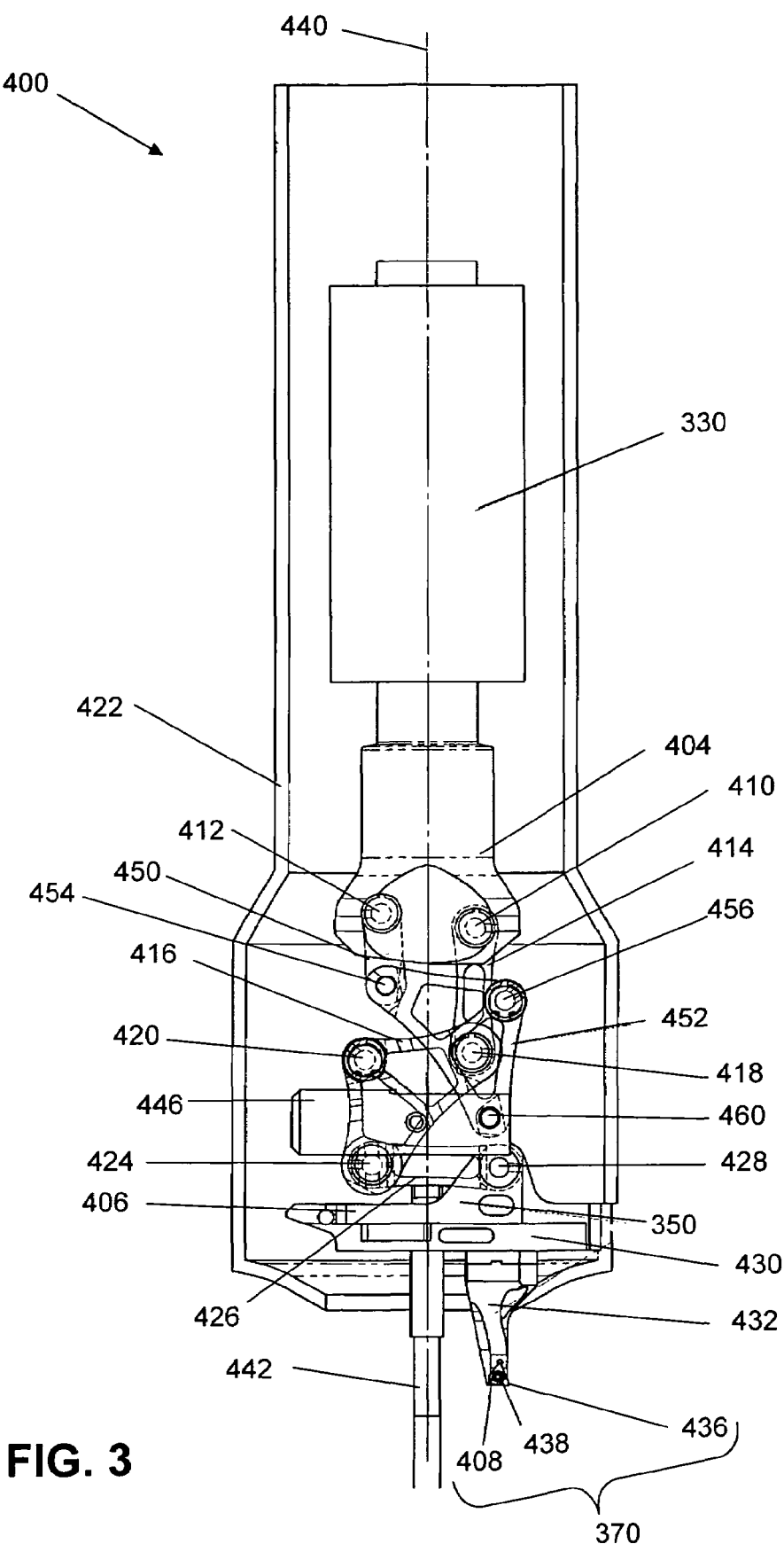
FIG. 3 is a side elevation of a machining head and spindle with the housing cut away to reveal the independent motor-driven kinetics of a second embodiment of the present invention.
Figure 4:
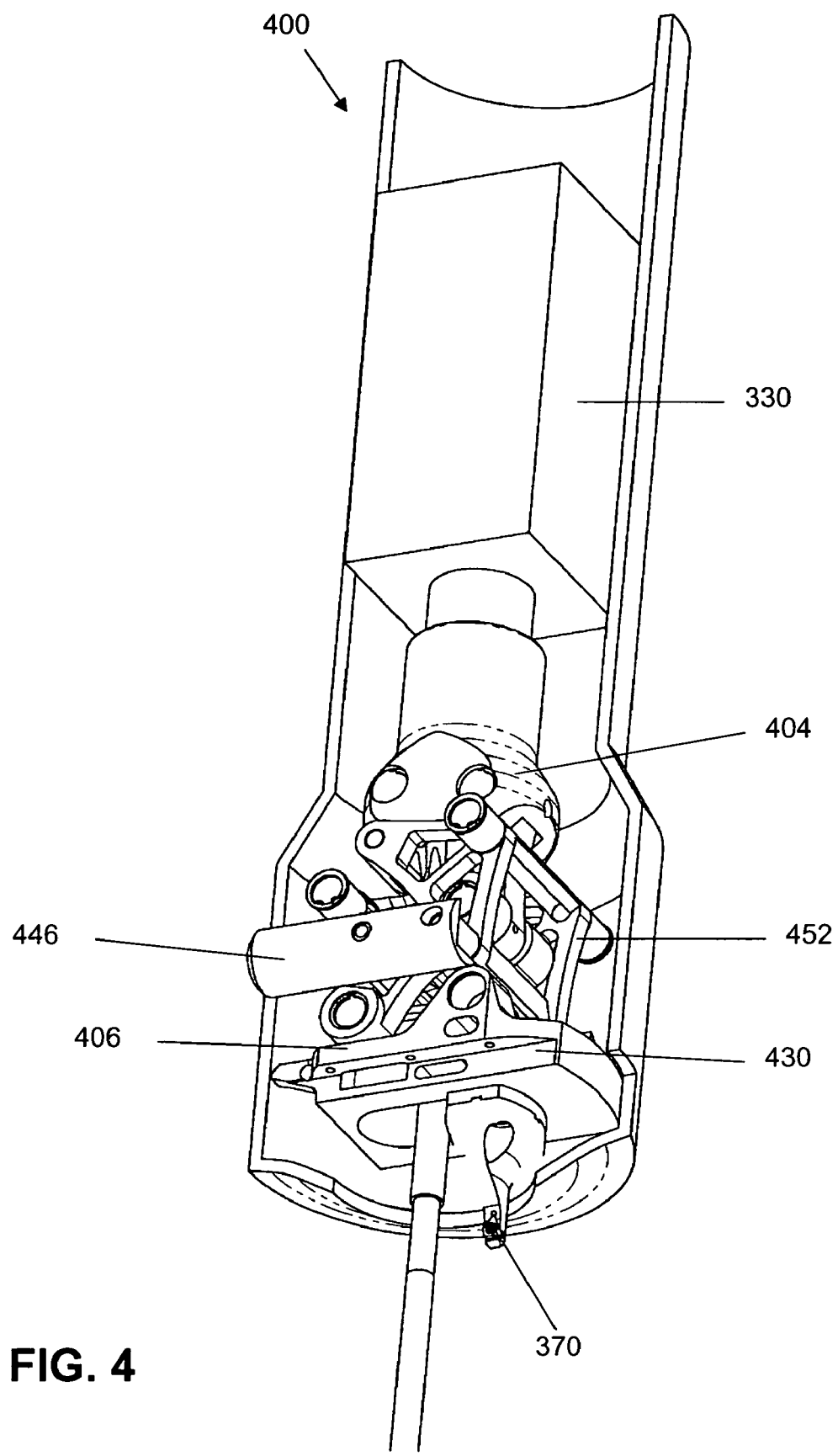
FIG. 4 is a perspective view of the embodiment of FIG. 3.

FIGS. 3 and 4 illustrate an embodiment of a contour machining head 400 for the invention. The contour machining head 400 is dynamically balanced and capable of operation which is play-free with zero backlash for optimum precision and near-perfect machining qualities. Counterweights 360 are used to maintain the dynamic balance of the contour machining head 400 to such a level of precision that relatively high rotational speeds of 1000 rpm or higher can be attained during machining. A contour machining head 400 is mounted to a machining spindle (not shown) and rotated by a driving system (not shown). The contour machining head 400 may be mounted in various configurations of a machining spindle with an associated machining head support such as a spherical housing 20, or similar type of housing that permits angular displacement of the contour machining head 400 at angles needed to access the workpiece such as a valve seats. In other applications, the contour machining head can be mounted with a spherical housing for angular displacement, or a fixed mounting that permits up and down movement, and possibly movement in the x-y plane. Selection of appropriate machining head support and translational mechanisms for the desired application will be apparent to one skilled in the art.

Referring to FIGS. 3 and 4, which are a side elevation and a perspective side view of the embodiment of a contour machining head 400, respectively, the contour machining head 400 receives a transmission arbor (not shown). The contour machining head 400 includes an arbor cap 404 that has a corresponding opening configured to receive a transmission arbor. The arbor cap 404 and transmission arbor connect to each other using a set screw or other appropriate fasteners (not shown). Typically, the transmission arbor is housed within a machining spindle (not shown) that is rotated by a driving system (not shown), which in turn provides a rotational force to the contour machining head 400. The contour machining head 400 may be mounted in various configurations of a machining spindle with an associated machining head support such as a spherical housing 20, such as is shown in FIG. 1, or similar type of housing that permits angular displacement of the contour machining head 400 at angles needed to access the workpiece. In other applications, the contour machining head can be combined with a spherical housing for angular displacement, or a fixed mounting that permits up and down movement, and possibly movement in the x-y plane. Selection of appropriate machining head support for the desired application will be apparent to one skilled in the art.

The transmission arbor is typically driven by a rotational drive motor, and with a combination of associated bearings and pinions may drive the arbor cap 404 in a rotational direction. An exemplary transmission arbor, rotational drive motor, and associated bearings and pinions that can be used with a contour machining head 400 are shown and described in related U.S. Pat. No. 6,640,410.

A second degree of motion is accomplished by an axial drive motor 330 or other drive means (not shown). The arbor cap 404 connects to the distal end of a transmission arbor which connects at its proximal end to an axial drive motor 330 or other drive means for effecting axial movement of the arbor cap 404. Axial movement of the arbor cap 404 provides radial movement or feed of a carriage 406. With this configuration, the contour machining head 400 is capable of working in both directions, forward and backward. The separate controls for feed and rotation allow the rate of radial travel of the bit tool to be varied during operation as needed, independent of rotation, permitting rapid variation in cutting diameter to create different profiles in a workpiece. An exemplary axial drive motor 330 that can be used with a contour machining head 400 is shown and described in related U.S. Pat. No. 6,640,410.

A third degree of motion is accomplished by another motor (not shown) which drives axial feed and retraction of the spindle and its sheath, independent of the carriage feed described above. An example of such a motor is provided in FIG. 32 of U.S. Pat. No. 6,530,727. This function provides fine adjustment of the height of the contour machining head 400 and bit tool 408 over the workpiece and controls cutting depth, including feeding the bit tool 408 during rotation to achieve the desired depth.

As illustrated in FIGS. 3 and 4, the arbor cap 404 has a pair of bores through the lower portion each of which retains an axle 410, 412 with the ends of each axle 410, 412 extending beyond the edges of the arbor cap 404. Connecting rod 414 pivotally connects at its first end to the axle 410, with the first end of the connecting rod 414 positioned within a recess in the lower portion of the arbor cap 404 as illustrated in FIGS. 3 and 4. Connecting rod 414 pivotally connects at its second end to a first end of a cantilever 416 via axle 418. As illustrated in FIGS. 3 and 4, cantilever 416 is a triangular-shaped structure, with two arms at its first end adjacent to axle 418 and two arms at its opposing second end. This configuration is selected for ease of manufacture and assembly. Other variations will be apparent to those of skill in the art, including one or two one-arm cantilevers. Cantilever 416 pivotally mounts on a cantilever axle 420 which connects in a fixed position to the interior of housing 422. The second end of cantilever 416 pivotally connects via axle 424 to the first end of a connecting rod 426. The second end of connecting rod 426 pivotally connects via axle 428 to the carriage 406.

Carriage 406 has an upward extension tab through which axle 428 passes to provide connection to connecting rod 426. Carriage 406 slides radially within contour machining head 400 on carriage guide 430, which can be formed integrally within housing 422 or attached as a separate component. The carriage guide 430 has rails (not shown) formed on opposite sides of a central portion opening (not shown). The spacing of the opening is adapted to closely fit an outer width of the carriage 406 so that the carriage 406 will slide with minimal resistance along the lengths of rails. Bit mount 432 extends downward from carriage 406. A threaded bore through bit mount 432 is adapted to receive locking screw (not shown) which is used to connect bit mount 432 to the carriage 406. A cutting tool assembly 370 comprises a triangular shaped bit tool 408 with a cutting bit 436 and a locking screw 438, and is mounted to the distal end of the bit mount 432. A cutting bit 436 and associated bit tool 408 extend from the bit mount 432. The bit tool 408 with a cutting tip (cutting bit 436) is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape of the bit tool 408 fits closely within a recess formed in the distal end of bit mount 432 to prevent movement of bit tool 408 relative to bit mount 432. For attachment of a new bit tool 408 and cutting bit 436, locking screw 438 is inserted through a slot in bit mount 432. Bit mount 432 is positioned along the carriage 406 by positioning the bit mount 432 relative to the locking screw 438, after which locking screw 438 is tightened to fix the bit mount 432 in place. The upper edge of bit mount 432 should abut the bottom surface of carriage 406 for good stability.

As illustrated in FIGS. 3 and 4, carriage 406 is slidably disposed within carriage guide 430 that connects to the lower portion of housing 422 via a plurality of screws or other fasteners (not shown). An upward motion of the transmission arbor pulls the arbor cap 404 upward which, through the linkage provided by connecting rod 414 lifts the first end of cantilever 416. Cantilever 416 pivots on fixed axle 420 causing the second end of cantilever 416 to swing inward toward a central axis 440 of the contour machining head 400. This motion pushes connecting rod 426 against the carriage 406, and through its connection via axle 428 forces carriage 406 to move along the carriage guide 430, moving the cutting bit assembly 370 radially outward, increasing the cutting diameter. Through the same series of linkages, a downward motion of the transmission arbor causes the second end of the cantilever 416 to pivot outward away from the central axis 440, moving the cutting bit assembly 370 radially inward and decreasing the cutting diameter.

The carriage guide 430 or lower portion of the housing 422 includes a pilot 442 that extends downward away from the carriage 406 and along the central axis 440. The pilot 442 permits the contour machining head 400 to locate and maintain a fixed position with respect to the workpiece upon which the bit tool 408 is to be applied.

Since the contour machining head 400 typically operates at a relatively high rotational speed, from 1000 rpm or higher, radial offset of the carriage 406 should be dynamically counterbalanced to maintain centering around the central axis 440 of the contour machining head 400. Counterbalancing of the contour machining head 400 is provided by an associated counterweight 446 and a second or counterpart counterweight (not shown) is mirror image in shape and size of counterweight 446 but attached on the opposite side as illustrated in FIGS. 3 and 4.

Counterweight 446 and its counter part moves in a direction opposite to that of the carriage 406. The mass of the two counterweights is selected to compensate exactly for the variation of the position of the center of gravity of the contour machining head 400 when the carriage 406 is moving.

Connecting rod 450, connected to the arbor cap 404 at axle 412, transfers force from the arbor cap 404 to cantilever 452. Cantilever 452 connects at its first end to connecting rod 450 via axle 454 and pivots on fixed cantilever axle 456 which in turn connects to housing 422. The second end of cantilever 452 connects to counterweight 446 and its counterpart via axle 460. Counterweight 446, and its counterpart are slidably disposed within respective counterweight guides (not shown) which are disposed adjacent to the central axis 440 of rotation of the contour machining head 400 to ensure proper balance in all directions.

When the transmission arbor is moved upward, the arbor cap 404 pulls connecting rod 414 upward, which in turn pulls up on the first end of cantilever 416. This movement causes the cantilever 416 to pivot on fixed cantilever axle 420, and the second end of the cantilever 416 moves towards the central axis 440 of the contour machining head 400. Through the connection provided by connecting rod 426 and axles 424, 428, the bit tool 408 moves away from the central axis 440. Simultaneously, the upward force on the arbor cap 404 causes the cantilever 452 to pivot on fixed cantilever axle 456, and the second end of the cantilever 452 moves towards the central axis 440 of the contour machining head 400. Through the connection provided by axle 460, the counterweights 446 and its counterpart move opposite the movement of the carriage 406. Thus, the upward movement of the transmission arbor 402 causes both the carriage 406 and counterweights 446 and its counterpart to move, so that with an upward movement of transmission arbor 402, both the carriage 406 and counterweights 446 and its counterpart move radially outward to maintain dynamic balancing around the rotational center.

Alternatively, when the transmission arbor 402 moves downward, both the carriage 406 and counterweights 446 and its counterpart move radially inward. The combination of the carriage 406 and counterweight assembly permit the contour machining head 400 to be used for either radial outward or radial inward cutting.

In an alternate embodiment of the kinematics of the contour head, the axial drive motor 330, the arbor cap 404, and the linkages associated with the movement of the carriage are replaced with a small linear motor 560. The preferred embodiment is described below.

Figure 5:
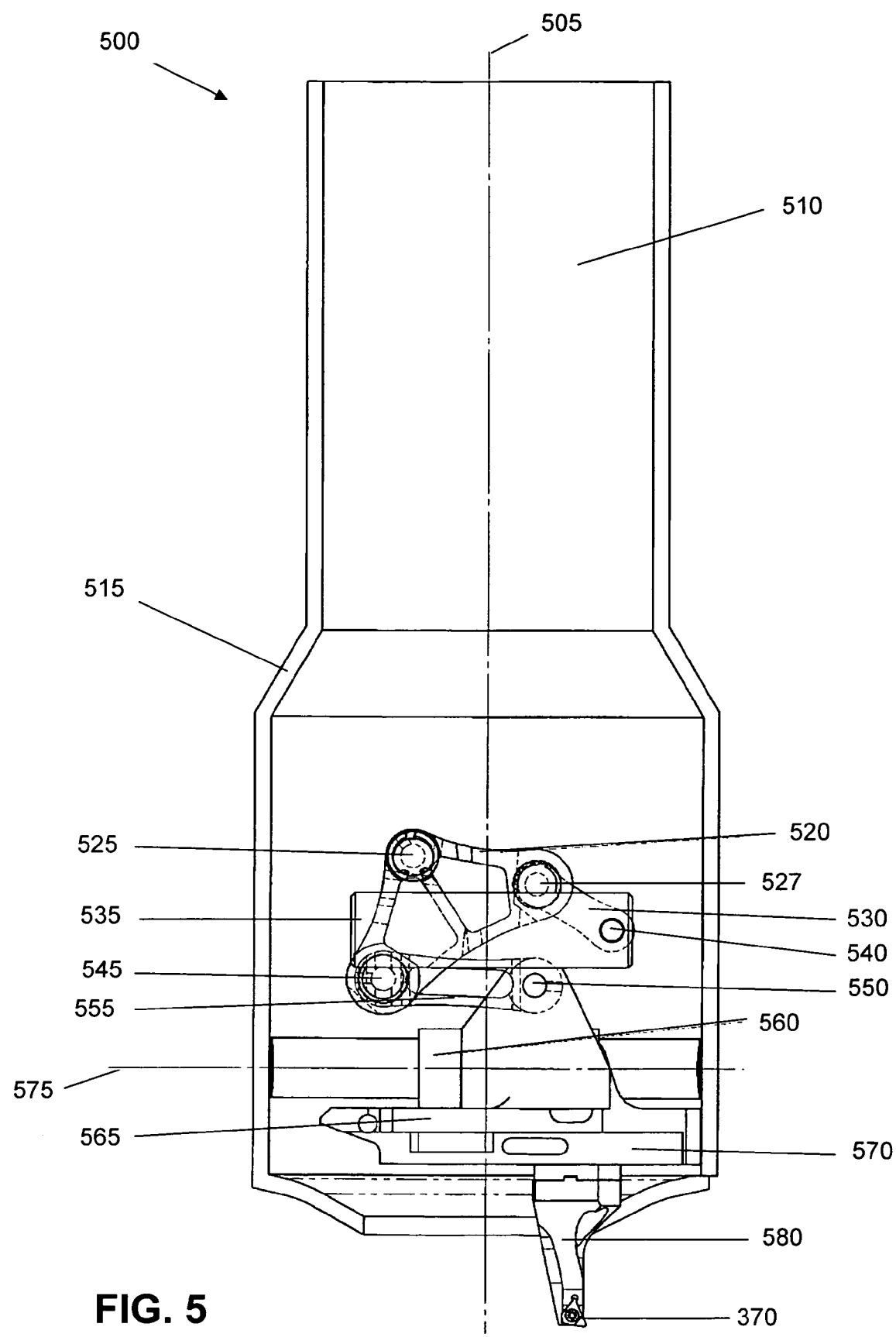
FIG. 5 is a side elevation of a machining head with the housing cut away to reveal a linear motor that drives the radial translation of the carriage in a third embodiment of the invention.
Figure 6:
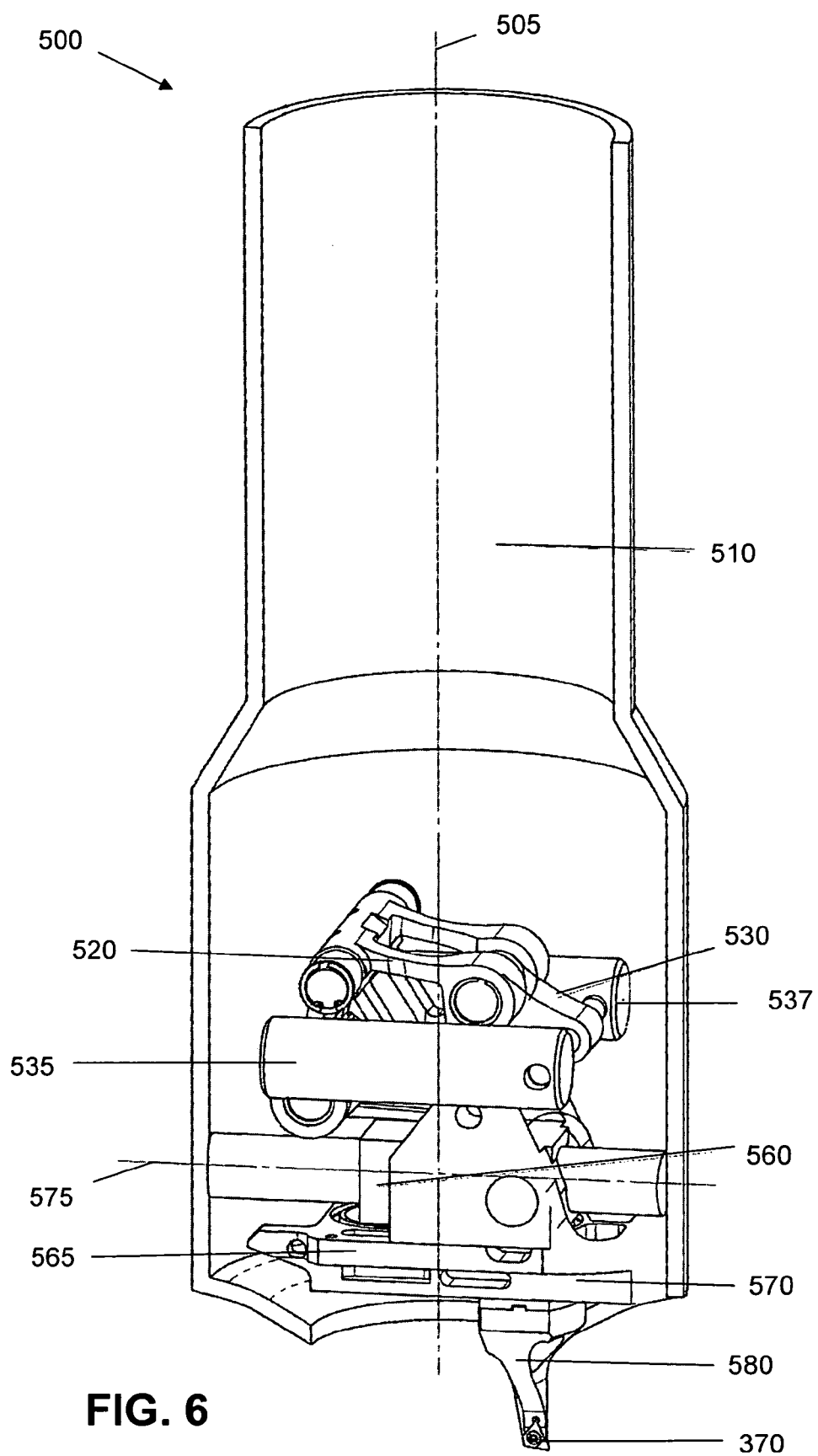
FIG. 6 is a perspective view of the embodiment of FIG. 5.

Referring to FIGS. 5 and 6, the contour machining head 500 may be mounted in various configurations of a machining spindle with an associated machining head support such as a spherical housing 20 (as in FIG. 1), or similar type of housing that permits angular displacement of the contour machining head 500 at angles needed to access the workpiece such as a valve seats. In other applications, the contour machining head can be mounted with a spherical housing for angular displacement, or a fixed mounting that permits up and down movement, and possibly movement in the x-y plane. Selection of appropriate machining head support for the desired application will be apparent to one skilled in the art.

A second degree of motion is accomplished by an linear motor assembly 560. the linear motor assembly is comprised of an micro electric motor, a gear reduction system, and a drive screw mechanism. The linear motor assembly 560 is mounted horizontally just above the carriage 565 and solidly connected to the interior housing 515. The carriage 565 is connected to the drive screw mechanism of the linear motor assembly in such a manner as to be displaced radially by the turning action of the drive mechanism. With this configuration, the contour machining head 500 is capable of working in both directions, forward and backward. The separate control of the linear motor assembly 560 allows the rate of radial travel of the bit tool to be varied during operation as needed, independent of rotation of the machine head 500, permitting rapid variation in cutting diameter to create different profiles in a workpiece A third degree of motion is accomplished by another motor (not shown) which drives axial feed and retraction of the spindle and its sheath, independent of the carriage feed described above, similar to the motor 330 in the previous embodiment. This function provides fine adjustment of the height of the contour machining head 500 and bit tool (not shown) over the workpiece and controls cutting depth, including feeding the bit tool during rotation to achieve the desired depth. An exemplary motor for fine adjustment that can be used with a contour machining head 500 is shown and described in related U.S. Pat. No. 6,640,410.

Since the contour machining head 500 typically operates at a relatively high rotational speed, from 1000 rpm or higher, radial offset of the carriage 406 should be dynamically counterbalanced to maintain centering around the central axis 505 of the contour machining head 500. Counterbalancing of the contour machining head 500 is provided by an associated counterweights 535 and 537, illustrated in FIGS. 5 and 6.

Counterweights 535 and 537 moves in a direction opposite to that of the carriage 565. The mass of the counterweights 535 and 537 are selected to compensate exactly for the variation of the position of the center of gravity of the contour machining head 500 when the carriage 565 is moving.

As the drive screw mechanism turns with the turning of the linear motor, the carriage moves radially either outward or inward along the horizontal axis 575, depending of the direction that the drive screw turns. The motion of the carriage transfers force to connecting rod 555, connected to the carriage 565 at axle 550, and transfers the movement of the carriage 565 to cantilever 520, connected to cantilever 520. Cantilever 520 connects at its first end to connecting rod 555 via axle 545 and pivots on fixed cantilever axle 525 which in turn connects to housing 515. The second end of cantilever 520 connects at its second end to connecting rod 530 via axle 527. Connecting rod 530 connects to respective counterweights 535, 537 via axle 540. Counterweights 535 and 537 are slidably disposed within respective counterweight guides (not shown) which is disposed adjacent to the central axis 505 of rotation of the contour machining head 500 to ensure proper balance in all directions.

As the drive screw mechanism turns with the turning of the linear motor, and the carriage moves radially outward along the horizontal axis 575, the carriage 565 pulls connecting rod 555 outward, which in turn pulls the first end of cantilever 520. This movement causes the cantilever 520 to pivot on fixed cantilever axle 525, and the second end of the cantilever 520 moves in an arc upwards and towards the central axis 505 of the contour machining head 500. Through the connection provided by connecting rod 530 and axles 527 and 540, the counterweights 535 and 537 move radially outward away from the central axis 505 along the horizontal axis 575 to maintain dynamic balancing around the rotational center.

Alternatively, when the drive screw mechanism turns with the turning of the linear motor, and the carriage moves radially inward, both the carriage 565 and counterweights 535 and 537 move radially inward maintaining dynamic balance around the rotational center. The combination of the carriage 565 and counterweights 535 and 537 permit the contour machining head 500 to be used for either radial outward or radial inward cutting.

The carriage guide 570 or lower portion of the housing 515 includes a pilot (not shown but similar to pilot 442 in FIGS. 3 and 4) that extends downward away from the carriage 565 and along the central axis 505. The pilot permits the contour machining head 500 to locate and maintain a fixed position with respect to the workpiece upon which the bit tool of the cutting tip assembly 370 is to be applied.

Although the present invention has been described herein with reference to particular means, materials, and embodiments, the present invention is not intended to be limited to the particulars disclosed herein; rather, the present invention extends to all functionally equivalent structures, methods and uses, such as are within the scope of the appended claims.

We claim:

1. A system for machining a workpiece having a surface topography, the system comprising:
    a single point cutting head disposed on a spindle, the single point cutting head having a carriage for radial movement of a cutting tip, wherein the spindle includes means for raising and lowering the cutting tip relative to the workpiece;
    a system controller for providing operational instructions to the single point cutting head;
    a probe for measurement of the surface topography of the workpiece, the probe comprising:
        a bracket for releasable attachment to the carriage;
        a probe finger having a distal end with a contact surface and a proximal end terminating at a lower piezo plate;
        an upper plate;
        at least one piezoelectric chip disposed between the lower piezo plate and the upper plate, the at least one piezoelectric chip for generating an electrical signal in response to pressure applied to the at least one chip;
        an electrical conductor for conducting the electrical signal from the at least one chip to a transmitter, wherein the transmitter transmits information contained in the electrical signal to the system controller;
    wherein the system controller operates the spindle and the carriage, moving the distal end of the probe finger to incrementally contact the surface of the workpiece to generate a plurality of contact points for create a profile representative of the surface topography of the workpiece, and wherein the system controller further calculates a difference between the surface topography and a desired machine profile to determine the material to be machined from the workpiece.

2. The system of claim 1, wherein the probe finger is formed from a resilient metal.

3. The system of claim 2, wherein the resilient metal is titanium.

4. The system of claim 1, wherein the electrical conductor comprises a printed circuit board having a microcontroller for generating operational data for the probe.

5. The system of claim 1, wherein the at least one piezoelectric chip comprises three chips disposed at a uniform radial spacing.

6. The system of claim 1, wherein the probe finger includes a flexible section.

7. The system of claim 1, wherein the upper support is attached to a flexible mounting.

8. A method for machining a workpiece with a single point cutter on a carriage disposed a machining head, comprising:
    disposing a probe on the carriage, the probe having a distal end;
    measuring a pre-existing topography of a target surface of the workpiece by translating the probe across the target surface while incrementally moving the machining head relative to the workpiece until the distal end of the probe contacts the target surface, wherein, when the target surface is contacted, the probe generates an electrical signal that is communicated to a system controller;
    within the system controller, generating a pre-cut profile corresponding to the pre-existing topography;
    calculating a difference between the pre-cut profile and a desired profile entered into the system controller;
    disposing a cutting tip on the carriage;
    controlling the machining head so that the cutting tip removes material from the workpiece corresponding to the difference.

9. The method of claim 8, wherein the desired profile is entered by a system user through a user interface.

10. The method of claim 8, wherein the desired profile comprises an existing profile formed in a different location on the workpiece or in another workpiece and the desired profile is entered into the computer controller by measuring the existing profile with the probe.

11. The method of claim 8, wherein the probe comprises three or more piezoelectric sensors.

12. A single point machining head for machining a workpiece, comprising:
    a spindle for rotating around a central axis, the spindle having means for vertical displacement;
    a carriage adapted for radial movement relative to the spindle;
    a cutting tip mounted on the carriage, wherein the cutting tip moves radially while the spindle moves vertically to machine a desired profile in the workpiece;
    a carriage drive assembly for applying force for effecting radial movement of the carriage, the drive assembly comprising an electric motor for turning a drive screw that runs in a direction perpendicular to the central axis, wherein the drive screw is linked to the carriage;
    a counterweight assembly comprising:
        at least one counterweight;
        a cantilever having a first end, a second end and a pivot point;

a first connecting rod having a first end pivotably attached to the carriage and a second end pivotably attached to the first end of the cantilever; and a second connecting rod having a first end pivotably attached to the second end of the cantilever and a second end pivotably attached to the at least one counterweight;

wherein, when the carriage moves radially in one direction, the at least one counterweight moves in an opposite direction so that the rotating machining head remains in balance as the carriage moves.

13. The single point machining head of claim 12, further comprising a probe releasably attached to the carriage for measuring a surface topography of the workpiece prior to machining with the cutting bit.

14. The single point machining head of claim 13, wherein the probe comprises a probe finger for contacting the surface of the workpiece and at least one piezoelectric chip for detecting pressure applied to the probe finger and generating an electrical signal correspondence to the surface profile.

15. The single point machining head of claim 14, further comprising a system controller for receiving the electrical signal and generating a surface profile using a plurality of data points of contact between the probe finger and the surface of the workpiece, wherein each data point of contact comprises a radial position of the carriage and a vertical position of the spindle.

* * * * *